United States Patent
Inoue et al.

(10) Patent No.: US 7,394,898 B1
(45) Date of Patent: Jul. 1, 2008

(54) ECHO REMOVING APPARATUS

(75) Inventors: Akira Inoue, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/611,198

(22) Filed: Mar. 5, 1996

(30) Foreign Application Priority Data

Mar. 13, 1995 (JP) ................................ P7-052431

(51) Int. Cl.
*H04M 9/00* (2006.01)
*H04B 3/23* (2006.01)

(52) U.S. Cl. ............................. 379/406.05; 379/406.02; 379/406.04

(58) Field of Classification Search ................. 379/410, 379/411, 412, 406, 407, 408; 370/32.1; 381/93, 381/94, 95, 96, 66, 73.1
See application file for complete search history.

(56) References Cited

U.S. PATENT DOCUMENTS

| | | | | | |
|---|---|---|---|---|---|
| 5,414,766 | A | * | 5/1995 | Cannalire et al. | 379/410 |
| 5,463,618 | A | * | 10/1995 | Furukawa et al. | 379/410 |
| 5,479,503 | A | * | 12/1995 | Fujiwara | 379/410 |
| 5,483,594 | A | * | 1/1996 | Prado et al. | 379/410 |

* cited by examiner

*Primary Examiner*—Fan S. Tsang
*Assistant Examiner*—Jacques M. Saint-Surin
(74) *Attorney, Agent, or Firm*—Jay H. Maioli

(57) ABSTRACT

An echo removing apparatus for reducing the echo caused by sound returning from a speaker to a microphone of a small-sized communication terminal, such as a portable telephone. The echo removing apparatus includes a filter unit for outputting a pseudo echo signal estimating an echo component returning to the microphone based upon a generated sound signal supplied to the speaker, a subtractor for subtracting the pseudo echo signal supplied from the filter unit from the sound generated collection signal supplied from the microphone and a first characteristics conversion unit for converting frequency characteristics of sound generated collection signals from the microphone on the frequency axis. The characteristics of the filter unit are controlled for minimizing an error component between an output signal of the first characteristics conversion unit and an output signal of the filter unit.

8 Claims, 10 Drawing Sheets

ECHO REMOVING APPARATUS

BACKGROUND OF THE INVENTION

This invention relates to an echo removing apparatus and, more particularly, to an echo removing apparatus for reducing the echo caused by the sound generated returning from a speaker to a microphone of a small-sized communication terminal, such as a portable telephone.

In keeping up with reduction in size of the sound generated communication terminal, such as a portable telephone, the effect as of the echo produced by the sound generated returning from the sound generated-receiving speaker to the sound generated-sending microphone becomes hardly negligible. For removing the echo caused by the sound generated returning round on the transmitter/receiver, an echo removing apparatus or an echo canceler shown for example in FIG. 1 is employed.

Referring to FIG. 1, a terminal 11 receives a speaker output signal x(k) transmitted from a communication partner to a speaker 12, where k denotes a sample number or a time position of discrete signals. A microphone input signal y(k), collected by a microphone 13 and thereby converted into an electrical signal, is supplied along with a pseudo echo signal supplied from a filter circuit 15 to a subtractor 14. The subtractor subtracts the pseudo echo signal supplied from the microphone input signal to form a resultant echo-reduced signal or a residual echo signal e(k) which is supplied to an input terminal 16. In a portable telephone, the speaker 12 and the microphone 13 are usually arranged close to each other as a telephone handset.

For the adaptive filter 15, a so-called finite response (FIR) filter is employed. The filter coefficients or tap coefficients are set for minimizing the error signal(k). The adaptive filter 15 filters the input signal, that is the speaker output signal x(k), for estimating the echo signal for generating the pseudo echo signal. This pseudo echo signal is provided to the subtractor 14 where the pseudo echo signal is subtracted from the microphone input signal y(k) to derive the residual echo signal or error signal e(k).

That is, if the input signal supplied from the terminal 11, that is the speaker output signal x(k), is the tap input to the N-tap FIR filter, operating as the adaptive filter 15, and the tap coefficients of the adaptive filter 15 are $b_k(i)$, where i=0, 1, . . , N−1, the pseudo echo signal outputted by the adaptive filter 15 is given by $$\hat{y}(k) = \sum_{i=0}^{N-1} b_k(i)x(k-1) \quad (1)$$

The subtractor 14 subtracts the pseudo echo signal of the equation (1) from the microphone input signal y(k) to derive the residual echo signal or error signal e(k) by:

$$e(k)=y(k)-\hat{y}(k) \quad (2)$$

The tap coefficient $\{b_k(i)\}$ of the adaptive filter 15, where i=1, 2, . . . , N−1, is updated, by a suitable algorithm, such as a least mean square (LMS) algorithm, learning identification method or a recursive least square (RLS) algorithm, for minimizing the time average of the power of the error signal e(k) of the equation (2), that is, $$E[\|e(k)\|^2]$$

where E[ ] is an expected value or a mean value of the value within the brackets [ ] and $\|e(k)\|^2$ is the square sum of e(k).

The tap coefficients of N taps of the adaptive filter 15 are equivalent to estimated values of the echo characteristics between the speaker 12 and the microphone 13.

Meanwhile, if desired to reduce the number of tapes N to the smallest possible value for simplifying the structure, the frequency characteristics of the residual echo are left in the low frequency range, even though the echo characteristics can be estimated partially with high accuracy by the adaptive filter 15, thus raising difficulties in effectively canceling the echo from sound generated input signals containing strong low-frequency components.

FIG. 2A shows the impulse response of the echo signals in association with the respective taps of the FIR filter. FIG. 2B, on the other hand, shows the impulse response of the residual echo signal obtained on subtracting the pseudo echo signal estimated by 20-tap FIR adaptive filter. It is seen from FIGS. 2A and 2B that the impulse response of the residual echo signal corresponding to 20 taps has been removed.

FIG. 3 shows, in association with FIGS. 2A and 2B, a spectral curve a of the echo signal and a spectral curve b of the residual echo signal produced on subtracting the estimated echo signal supplied from the 20-tap FIR adaptive filter.

Thus, even if it may appear that the echo characteristics can be substantially estimated by the 20-tap FIR adaptive filter, the frequency characteristics of the residual echo characteristics (curve b) are left in a region from 500 Hz to 1 kHz where the energy of sound generated signal would be concentrated to a larger extent.

SUMMARY OF THE INVENTION

It is therefore an object of the present invention to provide an echo removing apparatus in which satisfactory echo cancellation characteristics may be achieved even with a small number of taps of the FIR adaptive filter employed for estimating echo signals.

According to the present invention, there is provided an echo removing apparatus for removing the echo produced by sound generated from a sound generating means being returned to a sound collecting means arranged in proximity to the sound generating means. The echo removing apparatus includes a filter for outputting a pseudo echo signal estimating an echo component returning to a sound generated collecting means based upon a generated sound signal supplied to the sound generating means, subtraction means for subtracting the pseudo echo signal supplied from said filter means from sound generated collection signal supplied from said sound generated collection means, and first characteristics conversion means for converting frequency characteristics of sound generated collection signal supplied from sound generated collection means on the frequency axis. The characteristic of the filter means are control led for minimizing an error component between an output signal of the first characteristics conversion means and an output signal of the filter means.

The subtraction means subtracts the pseudo echo signal supplied from an output signal of the first characteristics conversion means. A second characteristics conversion means is also provided in the echo removing apparatus for converting frequency characteristics of an output signal of the subtraction means on the frequency axis.

The second characteristics conversion means is provided in the echo removing apparatus for converting frequency characteristics of an output signal of the filter means on the frequency axis. An output signal of the second characteristics conversion means is provided as a pseudo echo signal to the subtraction means for subtraction from sound generated collection signal supplied from sound generated collection means.

By subtracting the pseudo echo signal supplied from the signal corresponding to sound generated collection signal whose characteristics have been converted, and by adaptively controlling the characteristics of the filter means for minimizing the resulting error components, the echo cancellation characteristics may be improved even with a smaller number of taps of the filter means. In addition, a smaller processing volume suffices for achieving the echo cancellation characteristics comparable to those of a conventional echo removing apparatus.

DETAILED DESCRIPTION OF THE PREFERRED EMBODIMENTS

Figure 1:
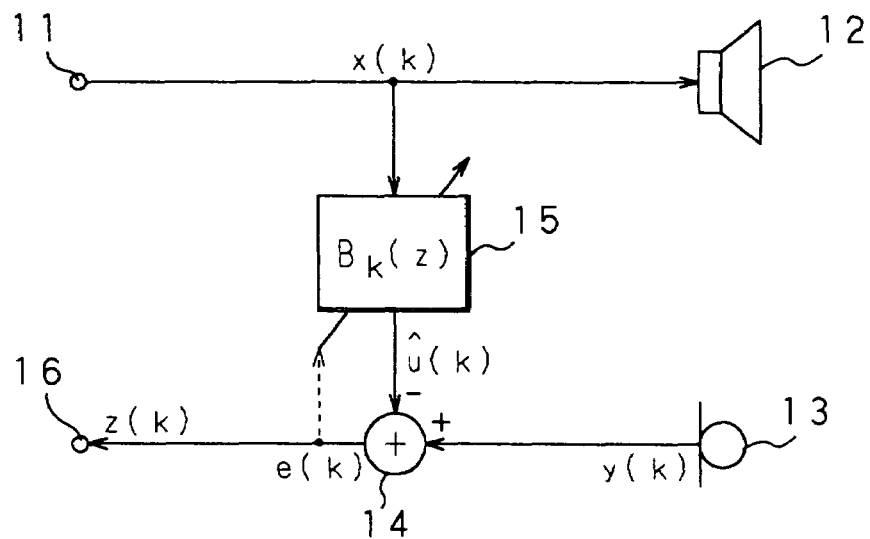
FIG. 1 is a schematic block diagram showing the structure of a conventional echo removing apparatus.
Figure 2A:
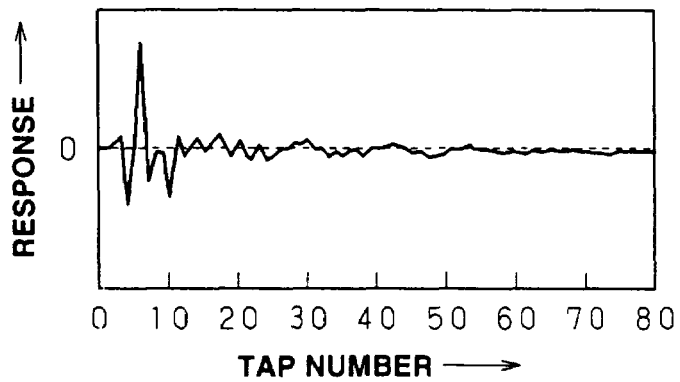
FIGS. 2A and 2B are graphs showing the response to the tap numbers of an FIR adaptive filter for echo estimation.
Figure 2B:
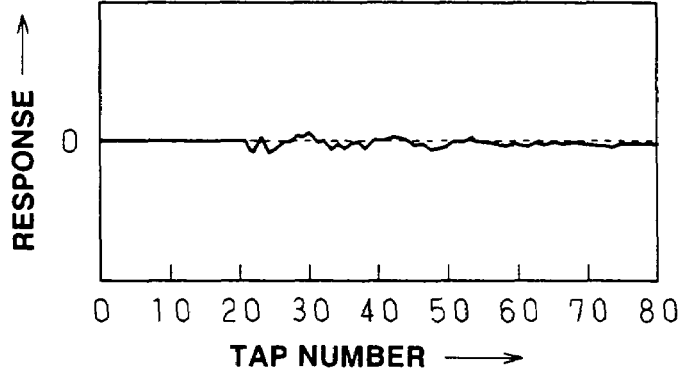
Figure 3:
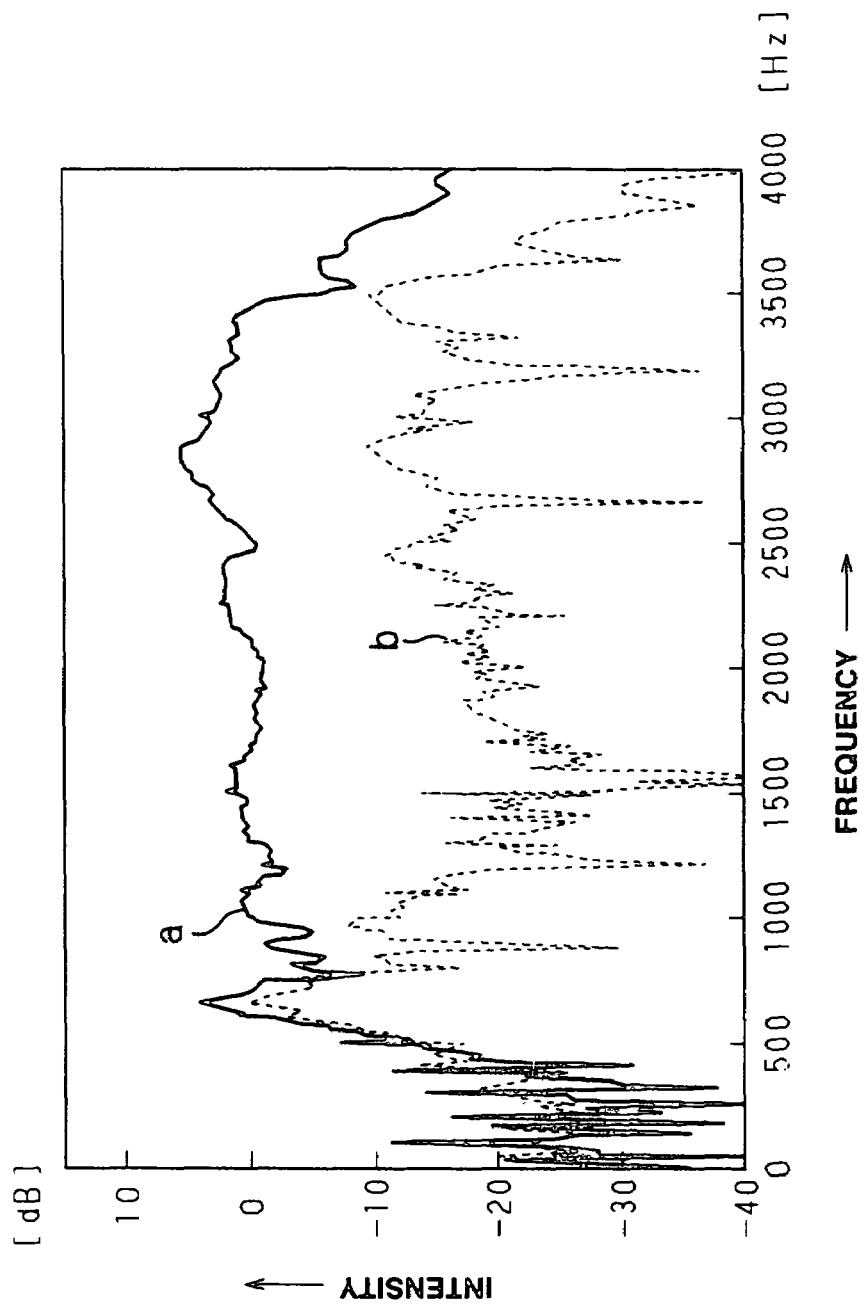
FIG. 3 is a graph showing a spectral curve for echo signals and a spectral curve for residual echo signals.

Referring to the drawings, certain preferred embodiments of the present invention will be explained in detail.

Figure 4:
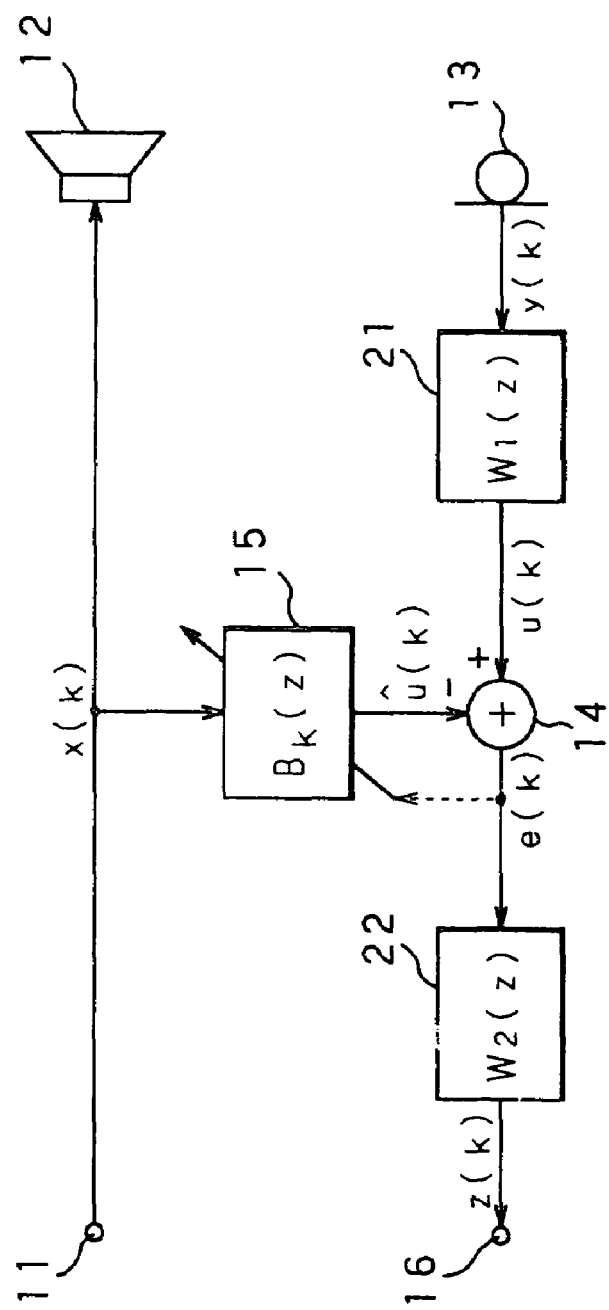
FIG. 4 is a schematic block diagram showing a basic structure of an echo removing apparatus according to the present invention.

FIG. 4 schematically shows an embodiment of an echo removing apparatus according to the present invention. To a terminal 11 is supplied a speaker output signal x(k) as a generated sound signal transmitted from a communication partner to a speaker 12, as the sound generating means. A microphone input signal y(k), collected by a microphone 13, arranged as sound collection means close to the speaker 12 as sound generating means, and thereby converted into an electrical signal, is converted by a characteristics conversion filter 21, as first characteristics conversion means, into a signal u(k), which is supplied to an echo-removing subtractor 14. The subtractor 14 subtracts the pseudo echo signal supplied from the adaptive filter 15 to form an echo-reduced signal or a residual echo signal e(k). This signal is filtered by a characteristics conversion filter 22 as second characteristics conversion means to form a signal z(k) which is outputted at a terminal 16 as an echo-reduced output signal.

In the present echo removing apparatus, employed as an example for the sound generated communication terminal of, for example, a portable telephone, the speaker 12 and the microphone 13 are usually arranged close to each other as a handset of a portable telephone.

The adaptive filter 15 may, for example, be a finite impulse response (FIR) filter having its filter coefficients or tap coefficients selected by adaptive processing which will minimize a time average value of the power of the error signal e(k). The adaptive filter 15 receives the input signal supplied from the terminal 11, which is the speaker output signal x(k), as a tap input, and outputs a pseudo echo signal, which estimates the signal u(k) from the characteristics conversion filter 21, to the subtractor 14.

The first characteristics conversion filter 21 converts characteristics of the input signal, that is the microphone input signal y(k), on the frequency axis. As an illustrative example, the filter 21 preferably has the characteristics of equalizing or whitening the input sound generated signal on the frequency axis. Although the second characteristic conversion filter 22 may be omitted, the second characteristic conversion filter 22, if used, preferably has the characteristics of canceling the filtering performed by the first characteristic conversion filter 21. That is, if the transfer functions of the first characteristic conversion filter 21 and the second characteristic conversion filter 22 are $W_1(z)$ and $W_2(z)$, respectively, these transfer functions preferably satisfy the relation:

$$W_1(z)*W_2(z)=1$$

For these filters, digital filters of the first or higher order are employed.

Figure 5:
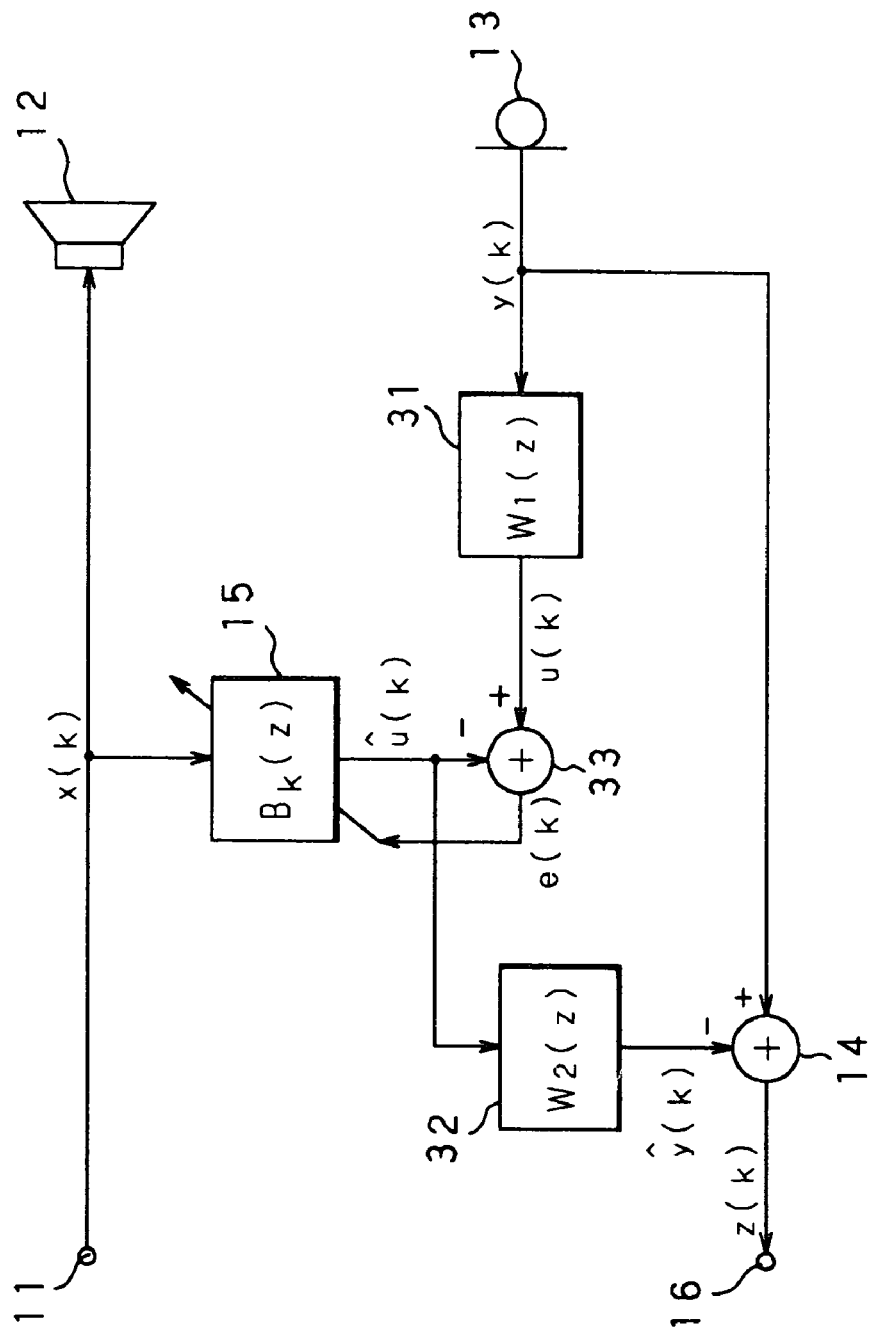
FIG. 5 is a schematic block diagram showing another basic structure of an echo removing apparatus according to the present invention.

Referring to FIG. 5, the basic structure slightly different from that shown in FIG. 4 is now explained.

In FIG. 5, a speaker output signal x(k) as a generated sound signal transmitted from a communication partner is supplied via a terminal 11 to a speaker 12 as the sound generating means. A microphone input signal y(k), collected by a microphone 13, arranged as a sound collection means close to the speaker 12 as the sound generating means, and thereby converted into an electrical signal, is supplied to a characteristics conversion filter 31, as a first characteristics conversion means, and to an echo-removing subtractor 14. The microphone input signal y(k) is filtered by a characteristics conversion filter 31 into a signal u(k) which is supplied to a subtractor 33 where the adaptive filter output signal supplied from the adaptive filter 15 is subtracted from the signal u(k) to form an error signal e(k). This error signal e(k) is supplied to a characteristic conversion filter 32 as the second characteristic conversion means where it is filtered to form a pseudo echo signal which is provided to the subtractor 14. The subtractor 14 subtracts the pseudo echo signal supplied from the microphone input signal y(k) to form an echo-reduced output signal z(k) which is outputted at a terminal 16. In the present echo removing apparatus, employed as an example for a sound generated communication terminal of, for example, a portable telephone, the speaker 12 and the microphone 13 are usually arranged close to each other as a handset of a portable telephone.

The adaptive filter 15 may, for example, be a finite impulse response (FIR) filter having its filter coefficients or tap coefficients selected by adaptive processing which will minimize a time average value of the power of the error signal e(k). The adaptive filter 15 receives an input signal at the terminal 11, which is the speaker output signal x(k), as a tap input, and outputs a pseudo echo signal, which estimates the signal u(k) from the characteristics conversion filter 21, to a subtractor 30.

The first characteristics conversion filter 31 converts characteristics of the input signal, that is the microphone input signal y(k), on the frequency axis. As an illustrative example, the filter 31 preferably has the characteristics of equalizing or whitening the input sound generated signal on the frequency axis. Although the second characteristic conversion filter 32 may be omitted, the second characteristic conversion filter 32, if used, preferably has the characteristics of canceling the filtering performed by the first characteristic conversion filter 31. That is, if the transfer functions of the first characteristic conversion filter 31 and the second characteristic conversion filter 32 are $W_1(z)$ and $W_2(z)$, respectively, these transfer functions preferably satisfy the relation:

$$W_1(z)*W_2(z)=1$$

For these filters, digital filters of the first or higher order are employed.

In the basic structure, shown in FIG. 5, the processing which is equivalent to the basic structure shown in FIG. 4 is performed by a signal flow different from that of FIG. 4. If the processing is realized with a digital signal processor (DSP), the gain of the transfer function $W_1(z)$ of the first characteristic conversion filter 31 may conveniently be controlled for effectively scaling the filter coefficients without distorting the sound generated by the speaker and talking at the microphone.

Several illustrative examples of the basic structures shown in FIGS. 4 and 5 will now be explained. Although only the basic structure of FIG. 4 is explained for simplicity of explanation, it should be noticed that the same holds for the basic structure shown in FIG. 5 as well.

Figure 6:
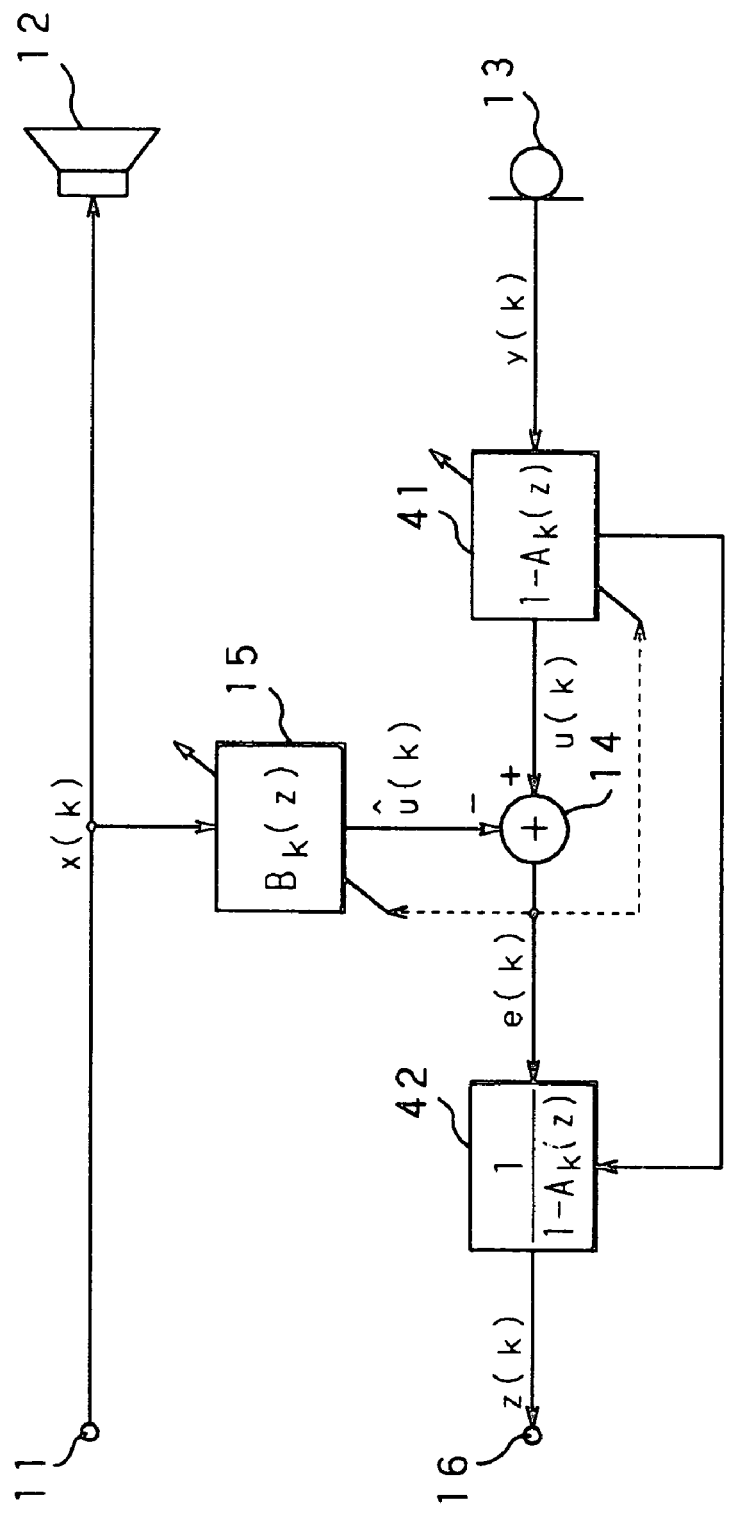
FIG. 6 is a block diagram showing an FIR adaptive filter employed as a filter for converting characteristics of the echo removing apparatus according to the present invention.

FIG. 6 shows a filter modified from the first characteristics conversion filter 21 of FIG. 4, in which filter coefficients of a transfer function $W_1(z)$ of the first characteristics conversion filter 21 have been adaptively changed so that the filter operates as an inverse filter or a whitening filter with respect to the residual echo signal or as the error signal e(k). The transfer function $W_2(z)$ of the second characteristic conversion filter is set to $1/W_1(z)$.

In FIG. 6, an FIR filter having N tapes is employed as the adaptive filter 15. If the tap coefficients are represented as $b_k(i)$, where i=0, 1, ..., N−1, the transfer function $B_k(k)$ is represented as $$B_k(z) = \sum_{i=0}^{N-1} b_k(i) z^{-i} \quad (3)$$

It is assumed that the transfer function $W_1(z)$ of an M-tap adaptive filter 41 equivalent to the first characteristic conversion filter 21 of FIG. 4 is given by $$W_1(z) = 1 - A_k(z) = 1 - \sum_{i=1}^{M} a_k(i) z^{-i} \quad (4)$$

In such case, a filter 42 is an infinite impulse filter (IIR) having its transfer function $W_2(z)$, equivalent to the transfer function $W_2(z)$ of the second characteristic conversion filter 22 of FIG. 4, represented by:

$$W_2(z) = \frac{1}{1 - A_k(z)} = \frac{1}{1 - \sum_{i=0}^{M} a_k(i) z^{-i}} \quad (5)$$

The filter 42 is otherwise the same in structure to the filter of FIG. 4 and hence the corresponding portions are designated by the same numerals and the description therefor is omitted for simplicity.

In the embodiment of FIG. 6, the filtering by the FIR adaptive filter 41 is performed to derive a signal u(k) shown by the equation (6):

$$u(k) = y(k) - \sum_{i=1}^{M} a_k(i) y(k-i) \quad (6)$$

On the other hand, the adaptive filter 15 receives the speaker output signal x(k), that is an input signal supplied from the terminal 11, as a tap input signal, and generates an adaptive filter output signal given by the equation:

$$\hat{u}(k) = \sum_{i=0}^{N-1} b_k(i) x(k-i) \quad (7)$$

The subtractor 14 subtracts an adaptive filter output from the adaptive filter 15 as shown by the equation (7) from the above signal U(k) from the FIR adaptive filter 41 to give the error signal e(k) shown by the equation (8):

$$e9k)=u(k)-\hat{u}(k) \quad (8)$$

The error signal e(k) from the subtractor 14 is filtered by the IIR filter 42 to give an echo-reduced output signal z(k) given by the equation:

$$z(k) = e(k) + \sum_{i=1}^{M} a_k(i) e(k-i) \quad (9)$$

which signal z(k) is outputted at the terminal 16.

In the above adaptive filtering, the tap coefficients $\{b_k(i)\}$ of the adaptive filter 15, where i=0, 1, ..., N−1, and the tap coefficients $\{a_k(i)\}$ of the FIR adaptive filter 41, where i=0, 1, ..., M, are updated to $\{b_{k+1}(i)\}$ and $\{a_{k+1}(i)\}$, respectively, using a suitable adaptive algorithm, such as a least mean square (LMS) algorithm or a normalized LMS or recursive least square algorithm (RLS), for minimizing the time average of the power of the error signal e(k) from the subtractor 14 given by $$E[\%\mathcal{B}(k)\%\square^2]$$

where E[ ] denotes an expected value over a mean value of a value within the bracket [ ] and $\|e(k)\|^2$ is a square sum of e(k). In association with the updating of the tap coefficients of the FIR adaptive filter 41, the coefficient $\{a_k(i)\}$ of the IIR filter 42 shown in the above equation (5) is also updated to $\{a_{k+1}(i)\}$.

In the illustrative embodiment, shown in FIG. 6, optimum echo cancellation characteristics may be achieved even in the case of a small number of taps of the adaptive filter 15, while the processing volume needs to be increased only to a lesser extent.

The filters of variable coefficients, such as the FIR adaptive filter 41 or the IIR filter 42, configured for characteristics conversion, may be replaced by filters of fixed coefficients.

Figure 7:
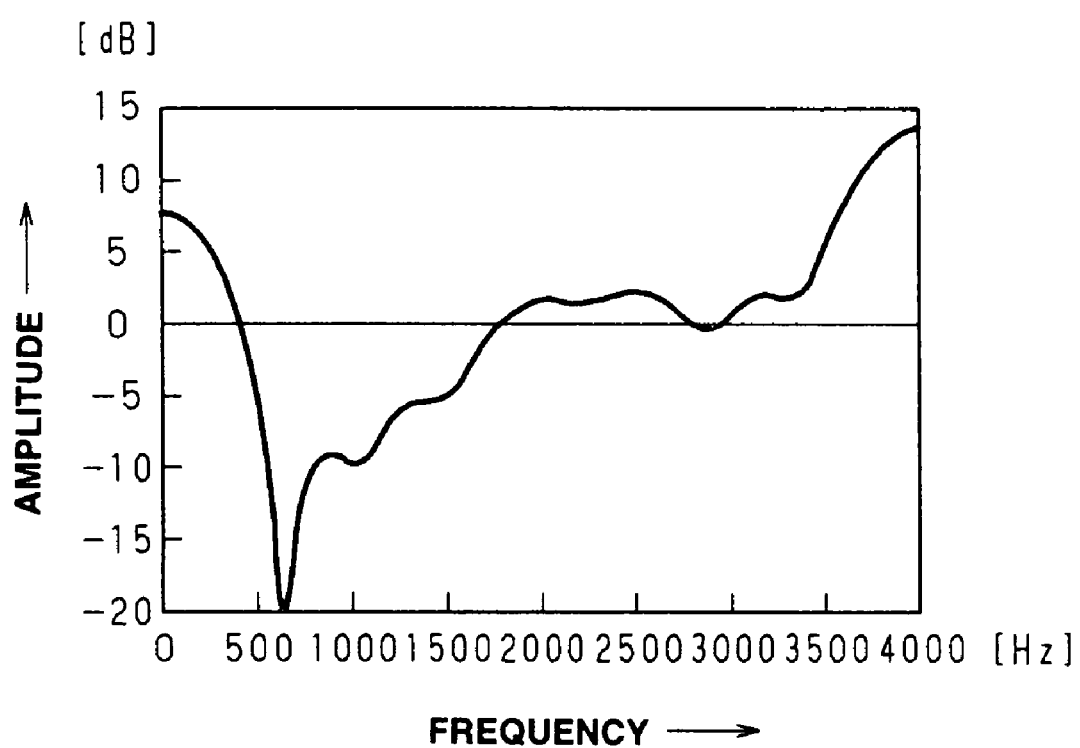
FIG. 7 is a graph showing frequency characteristics of a fixed-coefficient FIR filter employed as a filter for converting characteristics of the echo removing apparatus according to the present invention.
Figure 8:
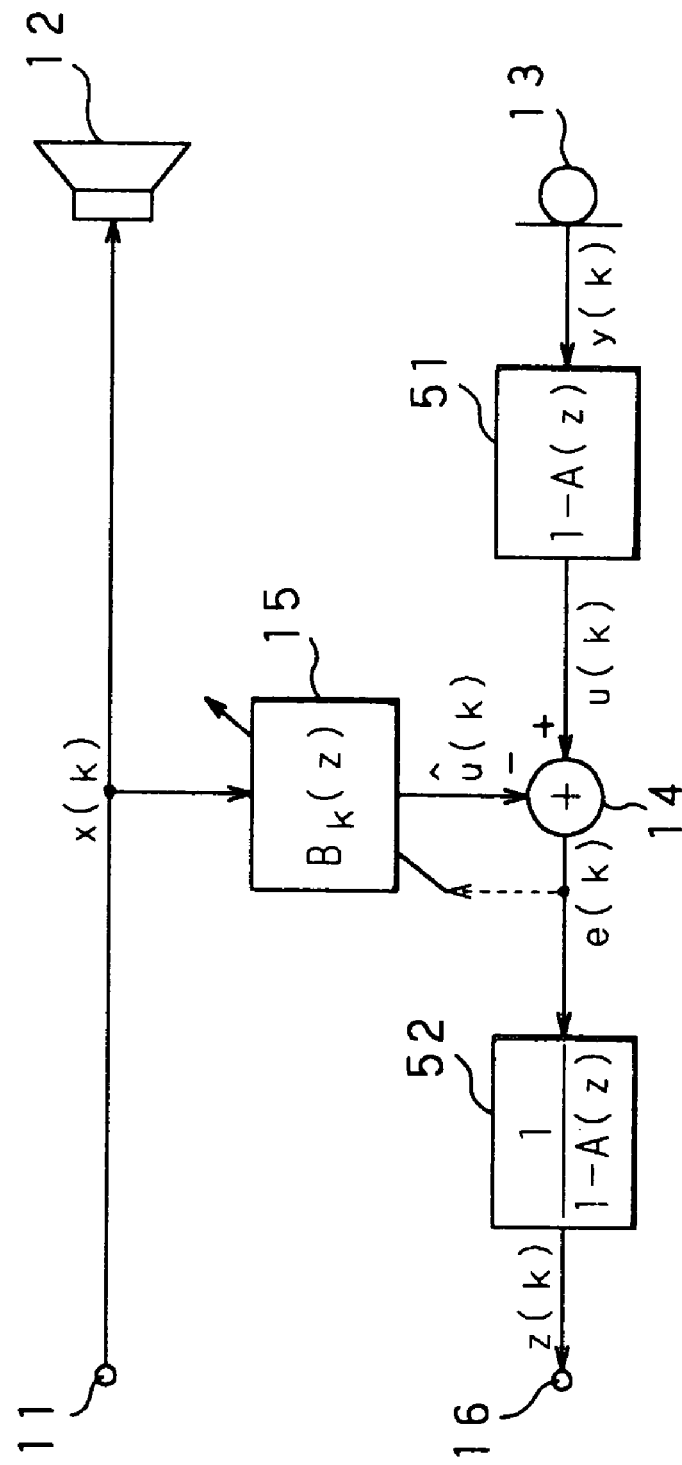
FIG. 8 is a block diagram showing a fixed-coefficient FIR filter employed as a filter for converting characteristics of the echo removing apparatus according to the present invention.

FIG. 7 shows an example of frequency characteristics of an FIR filter employed as a first characteristics conversion means, and FIG. 8 shows a schematic structure of an echo removing apparatus employing a characteristics conversion filter of a fixed coefficient. That is, typical frequency characteristics of the fixed coefficient FIR filter 51 as the first characteristics conversion means of FIG. 8 is shown in FIG. 7.

In FIG. 8, an FIR filter 51 operating as an inverse filter or a whitening filter with respect to the residual echo signal or the error signal E(k) is employed as a filter equivalent to the first characteristic conversion filter 21 of FIG. 1.

In FIG. 8, an N-tap FIR filter is employed as adaptive filter 15. If the tap coefficients of the N-tap FIR filter are denoted by $b_k(i)$, where $i=0, 1, \ldots, N-1$, its transfer function $B_k(k)$ is given by the equation:

$$B_k(z) = \sum_{i=0}^{N-1} b_k(i) z^{-i} \tag{10}$$

On the other hand, assuming that the transfer function $W_1(z)$ of, for example, an M-tap FIR filter 51, equivalent to the first characteristic conversion filter 21 of FIG. 4, is represented by $$W_1(z) = 1 - A_k(z) = 1 - \sum_{i=1}^{M} a_k(i) z^{-i} \tag{11}$$

In this case, a filter 52, corresponding to the transfer function $W_2(z)$ of the second characteristic conversion filter 2 of FIG. 4, is an IIR filter whose transfer function $W_2(z)$ is given by the equation:

$$W_2(z) = \frac{1}{1 - A_k(z)} = \frac{1}{1 - \sum_{i=1}^{m} a_k(i) z^{-i}} \tag{12}$$

Since the other structure of the filter is the same as that shown in FIG. 4 or 6, the corresponding portions are denoted by the same numerals and the corresponding description is omitted for simplicity.

As the frequency characteristics of $\{1-A(z)\}$ of the above equation (11), such characteristics which will suppress the low-range side energy while enhancing the high range side energy, as shown in FIG. 7, are employed.

In the illustrative embodiment of FIG. 8, the microphone input signal y(k) from the microphone 13 is filtered by the FIR adaptive filter 41 to derive a signal u(k) as shown by the equation (13):

$$u(k) = y(k) - \sum_{i=1}^{M} a_k(i) y(k-i) \tag{13}$$

On the other hand, the adaptive filter 15 receives the speaker output signal, which is the input signal at the terminal 11, as a tap input signal, and generates an adaptive filter output signal given by:

$$\hat{u}(k) = \sum_{i=0}^{N-1} b_k(i) x(k-1) \tag{14}$$

The subtractor 14 subtracts an adapter filter output signal of the equation (14) from the adaptive filter 15 from the above signal u(k) from the FIR adaptive filter 51 to derive an error signal e(k) represented by the equation (15):

$$e(k) = u(k) - \hat{u}(k) \tag{15}$$

This error signal e(k) is filtered by the above IIR filter 42 to produce an echo-reduced output signal z(k) represented by $$z(k) = e(k) + \sum_{i=1}^{M} a_k(i) e(k-i) \tag{16}$$

The tap coefficient $\{b_k(i)\}$ of the adaptive filter 15 is updated by a suitable adaptive algorithm for minimizing the time average of the power of the error signal e(k), as in the illustrative embodiment shown in FIG. 6.

With the embodiment of FIG. 8, the structure and the processing volume may be decreased, as compared to the embodiment shown in FIG. 6, in an amount corresponding to the adaptive processing of the characteristics conversion filter which may be omitted.

Next, in a system employing a sound generated encoding system, the coefficients of the characteristics conversion filter may be determined on the basis of sound generated encoding parameters.

Figure 9:
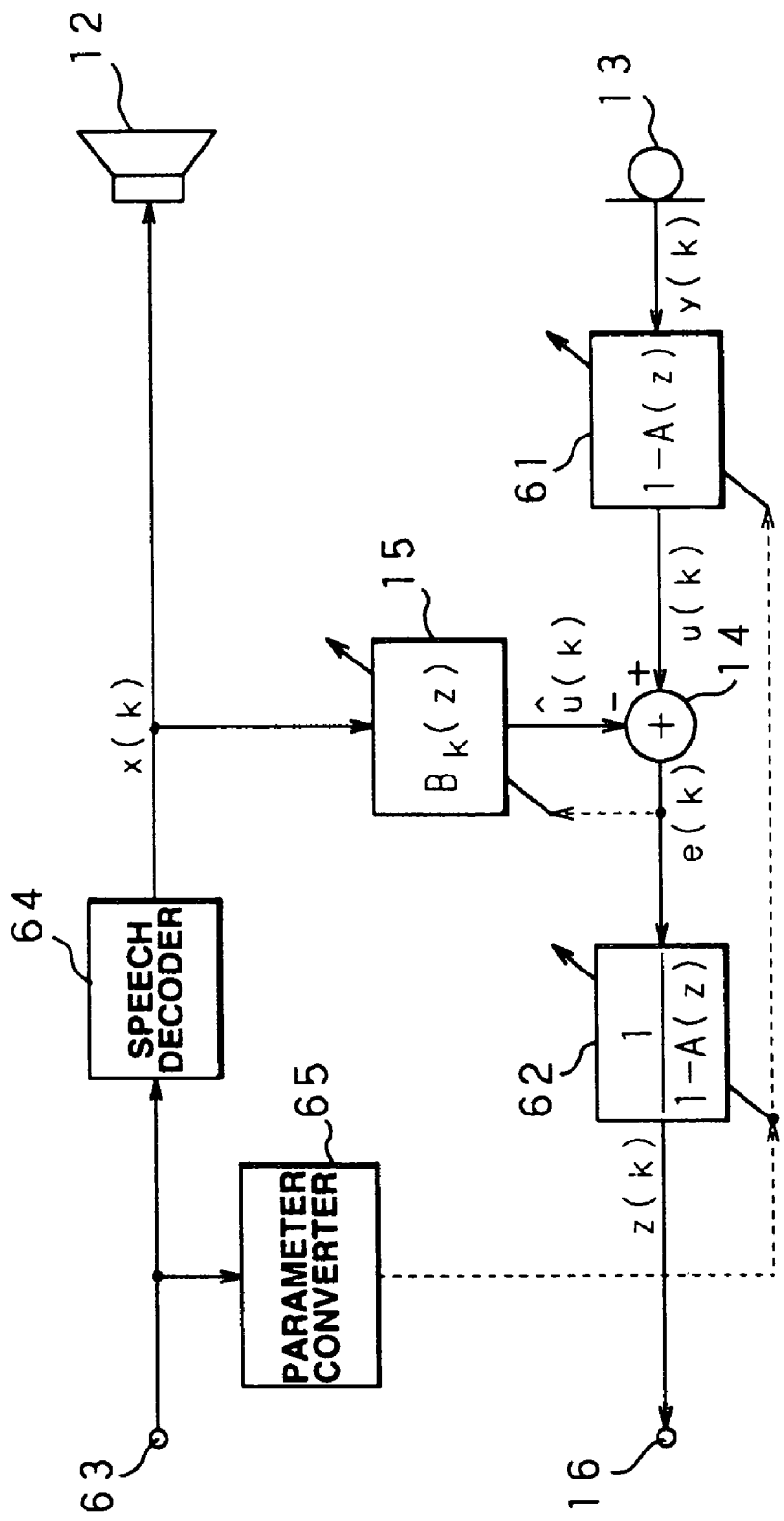
FIG. 9 is a block diagram showing an echo removing apparatus according to the present invention on the decoder side of sound generated encoding system.

FIG. 9 shows an illustrative embodiment of an echo removing apparatus employed on the decoder side of the sound generated encoding system.

In FIG. 9, filters 61, 62 are equivalent to the first characteristic conversion filter 21 and to the second characteristic conversion filter 22 of FIG. 1, respectively.

To an input terminal 63 are supplied parameters characteristic of sound generated and encoded sound generated signals encoded and transmitted by the encoder and received by the receiver. These encoded sound generated signals are decoded by sound generated decoder 64 into a speaker output signal x(k) as the generated sound signal or sound generated signal which is sent to the speaker 12 as sound generating means.

The parameters characteristic of sound generated, such as vocal tract parameters or a-parameters of VSELP, supplied from the input terminal 63, are sent to a parameter converter 65 where they are converted into filter coefficients of the characteristics conversion filters 61, 62 for updating the filter coefficients of the filters 61, 62. The coefficients of the filter 61 equivalent to the first characteristic conversion filter are converted into coefficients which will enable the whitening filter coefficients of whitening the input signals to be produced. On the other hand, the coefficients of the filter 62 are converted into coefficients which will enable opposite filter characteristics to be produced.

The microphone input signal y(k) from the microphone 13 is filtered by the filter 61 to derive the signal u(k) represented by the equation (17):

$$u(k) = y(k) - \sum_{i=1}^{M} a_k(i) y(k-1) \tag{17}$$

The adaptive filter 15, receiving the speaker output signal x(k) from sound generated decoder 64 as the tap input signal, produces an adaptive filter output given by:

$$\hat{u}(k) = \sum_{i=0}^{N-1} b_k(i) x(k-i) \tag{18}$$

The subtractor 14 subtracts the adaptive filter output from the signal u(k) from the signal u(k) from the FIR adaptive filter 61 to produce an error signal e(k) represented by the equation (19):

$$e9k)=u(k)-\hat{u}(k) \tag{19}$$

The error signal e(k) from the subtractor 14 is filtered by the filter 62 to give an error-reduced signal z(k) represented by the equation:

$$z(k) = e(k) + \sum_{i=1}^{M} a_k(i) e(k-i) \tag{20}$$

which is outputted at the terminal 16.

In the adaptive filter 15, the tap coefficient $\{b_k(i)\}$ is updated by adaptive processing by any suitable adaptive algorithm for minimizing the time average of the power of the error signal e(k) from the subtractor 14. On the other hand, the filter coefficients of the filters 61 and 62 are converted and updated into those of the whitening filter or the inverse filters thereof by a parameter converter 65.

Next, an illustrative embodiment of employing the learning identification method or the normalized LMS (least mean square) method in the adaptive algorithm for the adaptive filter 15 for echo estimation in the above-described embodiments shown in FIGS. 4 to 9, is hereinafter explained.

In-the present illustrative embodiment, the smoothed input signal power value is employed as the tap input signal power of the equation employed for tap coefficients or filter coefficients of the learning identification method for producing echo removing characteristics or echo cancellation characteristics even in the case where the number of taps is smaller than the sound generated pitch period.

That is, in the illustrative embodiment of FIG. 8, if the usual learning identification method is used as the tap coefficient-adaptive algorithm of the N-tap FIR adaptive filter as the adaptive filter 15, the equations for updating the N tap coefficients $b_k(i)$ into $b_{k+1}(i)$ are:

$$b_{k+1}(i) = b_k + \frac{\delta_c \cdot \mathcal{C}(k) x(k-i)}{\%\Box X(k)\%\Box^2} \text{ where } i = 0, 1, \ldots N-1 \tag{21}$$

and $$\%\Box X(k)\%\Box^2 = \sum_{i=0}^{N-1} \%\Box x(k-i)\%\Box^2 \tag{22}$$

where μ is a constant known as a step gain parameter.

Figure 10:
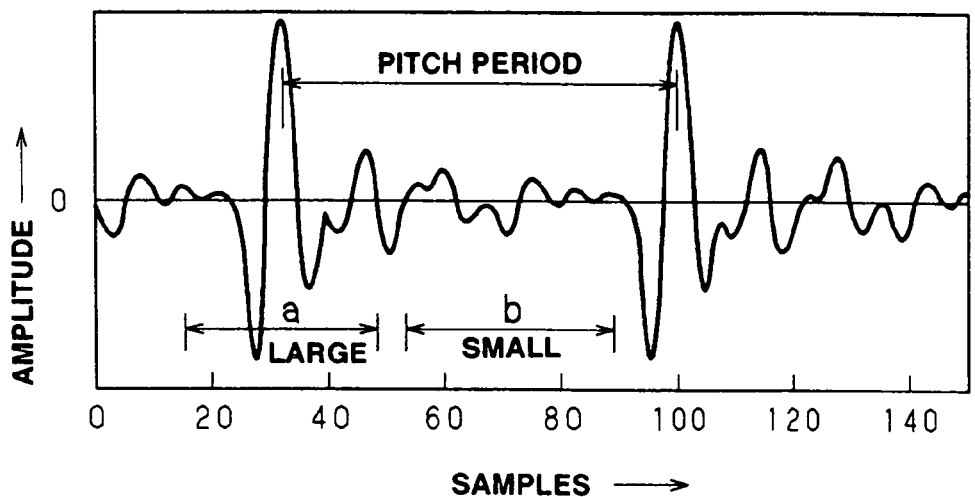
FIG. 10 is a graph showing the relation between the pitch period of the input signal and the number of filter taps.
Figure 11:
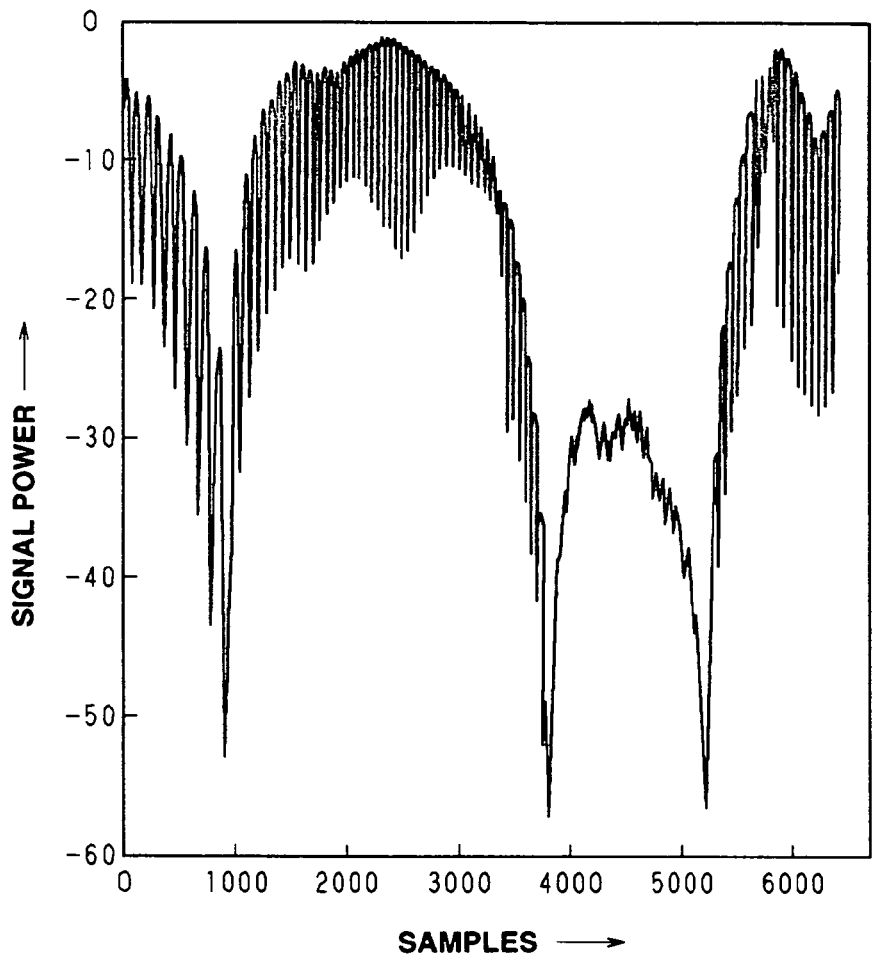
FIG. 11 is a graph illustrating input signal power fluctuations in case of a smaller number of filter taps.

However, if the tap length N of the FIR adaptive filter is shorter than the sound generated pitch period, as shown in FIG. 10, the denominator of the equation (21), that is the tap input signal power or the square sum, as calculated by the equation (22), is significantly fluctuated, as shown in FIG. 11. For example, the square sum, which is the power in the domain a corresponding to the tap length of FIG. 10, becomes larger, while the power in the domain b becomes smaller. If the input signal power or the square sum is fluctuated in this manner, the tap coefficient updated by the equation (21) the tap coefficients updated by the equation (21) are fluctuated, thus occasionally making it impossible to produce stable echo removing or suppression characteristics. Thus the denominator of the equation (21), that is the input signal power or the square sum calculated by the equation (22), is replaced by a power value smoothed by a suitable method, that is a smoothed value of the input signal power $P_x(k)$, for realizing stable echo removing or suppression characteristics.

If such smoothed input signal power value $P_x(k)$ is employed, tap coefficient updating is performed in accordance with the following equation (23):

$$b_{k+1}(i) = b_k + \frac{\delta_c \cdot \mathcal{C}(k) x(k-1)}{P_x(k)}, i = 0, 1, \ldots, N-1 \tag{23}$$

An illustrative example of the method for calculating the smoothed value of the input signal power $P_x(k)$ in the equation (23) is to find a square sum value of the number of samples L sufficiently larger than the number of taps N in order to find a value normalized over N samples, that is to execute the calculation denoted by $$P_k(k) = \frac{N}{L} \sum_{i=0}^{L-1} \%\Box x(k-i)\%\Box^2 \tag{24}$$

Another method for calculating the smoothed input signal power $P_x(k)$ is to effect smoothing by a time constant longer than the pitch period of the input signal, that is to execute the calculation denoted by $$P_x(k) = \& \Box P_x(k-1) + (1 - \& \Box)\%\Box x(k)\%\Box^2$$

(25)

In the equation (25), λ is a constant such that 0<λ<1, with the corresponding time constant being 1/(1−λ).

By employing the smoothed power, that is the smoothed input signal power $P_x(k)$, variations in the filter coefficients or tap coefficients may be suppressed for achieving stable echo removing or suppression characteristics.

Figure 12:
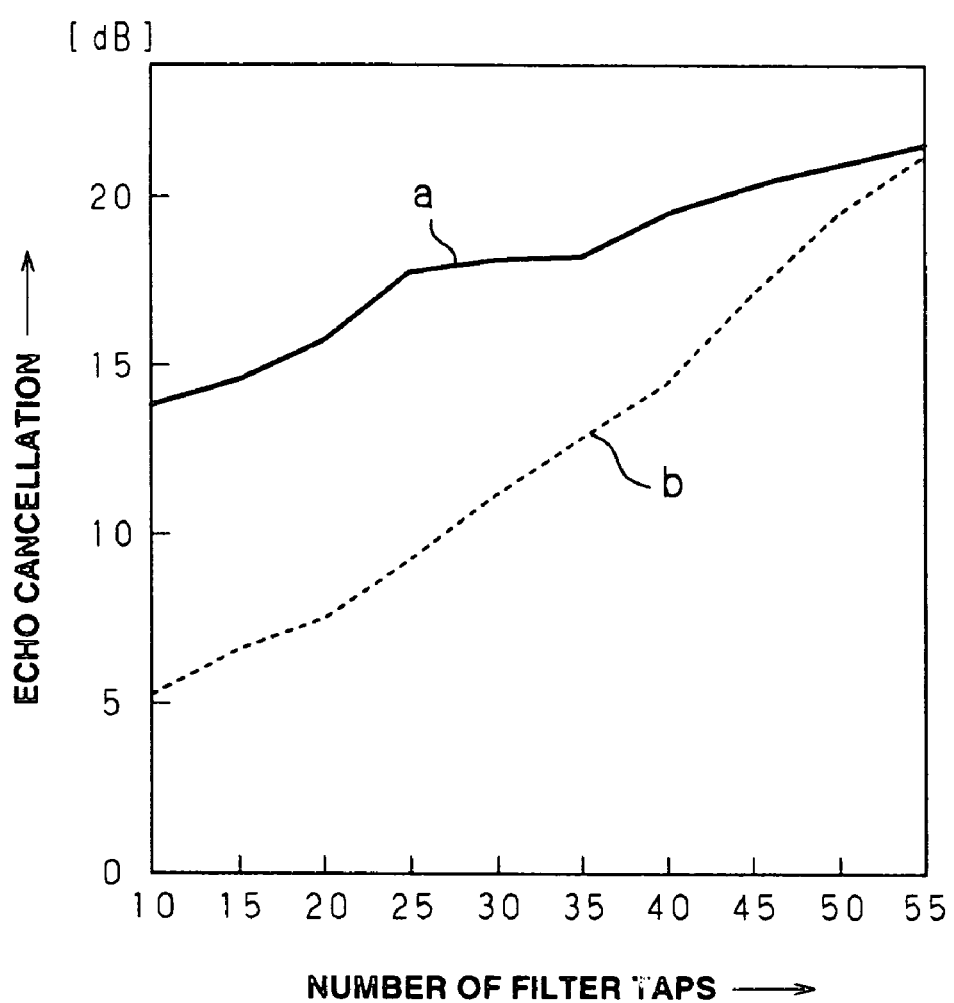
FIG. 12 is a graph showing the amount of echo cancellation and the number of filter taps.

Referring to FIG. 12, the echo cancellation characteristics in the case of employing the above-described structure of the illustrative embodiment will be hereinafter explained.

In the graph of FIG. 12, the number of taps of the FIR filter, as the adaptive filter 15, is taken on the abscissa and the amount of echo cancellation ERLE is taken on the ordinate. The amount of echo cancellation is defined by the following equation (26):

$$\text{amount of echo cancellation } (ERLE) = \frac{\text{time average of echo cancelor output voltage}}{\text{time average of microphone input voltage}}$$

The echo canceler output voltage of the equation (26) is the power of the signal z(k) taken out at the terminal 16, while the microphone input voltage is the power of the microphone input signal y(k) from the microphone 13.

In FIG. 12, a curve a stands for the amount of echo cancellation in the case of using a characteristic conversion filter FIR filter 51, such as a fixed coefficient filter with the number CL of taps M equal to 12, and a filter 52 functioning as its inverse filter, while a curve b stands for the amount of echo cancellation in the case of using a conventional structure not employing the filters 51 and 52.

It is seen from FIG. 12 that, for a domain corresponding to a smaller number of taps of the adaptive filter 15, the echo cancellation characteristics can be significantly improved by adding the characteristics conversion filters 51 and 52. As such a smaller processing volume suffices. That is, even if the characteristics conversion filters are added, a smaller processing volume suffices if the number of taps of the adaptive filter 15 is less than a tenth of that in the case of a conventional echo removing apparatus not provided with characteristics conversion filters.

Thus, with a smaller number of taps of the FIR adaptive filters, echo cancellation characteristics with higher effects may be achieved, while the processing volume required for achieving echo cancellation characteristics comparable to those of the echo removing apparatus may be reduced.

The present invention is not limited to the above-described embodiments. For example, although the basic structure of FIG. 1 is implemented in the illustrative embodiments of FIGS. 6 to 9, the basic structure of FIG. 5 may be implemented in a similar manner. In addition, the present invention may be applied to variety of sound generated communication terminals, in addition to the portable telephone. Sound generating means or sound generated collecting means are not limited to the speaker or to the microphone. In addition, the filter coefficient of the FIR adaptive filter may be estimated not only by the learning identification method but by a variety of other adaptive algorithms.

What is claimed is:

1. An echo removing apparatus for removing an echo produced by sounds generated by a sound generator being returned to a sound collector arranged in proximity to said sound generator, comprising:

filter means for outputting a pseudo echo signal estimating an echo component returning to said sound collector based upon a generated sound signal supplied to said sound generator;

first characteristics conversion means for modifying frequency characteristics of a collection signal supplied from said sound collector on a frequency axis and producing a converted collection signal; and subtraction means for subtracting said pseudo echo signal produced by said filter means from said converted collection signal produced by said first characteristics conversion means to produce an echo-reduced output signal.

2. The echo removing apparatus as claimed in claim 1 further comprising second characteristics conversion means for modifying frequency characteristics of said echo-reduced output signal of said subtraction means on the frequency axis.

3. The echo removing apparatus as claimed in claim 1 further comprising:

second characteristics conversion means for modifying frequency characteristics of said pseudo echo signal from said filter means on the frequency axis, an output signal of said second characteristics conversion means being provided as a second pseudo echo signal fed to a second subtraction means for subtraction from said collection signal supplied by said sound collector.

4. The echo removing apparatus as claimed in claim 1 wherein said first characteristics conversion means has characteristics of equalizing the frequency characteristics of the collection signal on the frequency axis.

5. The echo removing apparatus as claimed in claim 1 wherein said first characteristics conversion means is an adaptive filter with a plurality of adaptively selected coefficients, said coefficients selected to minimize an error component of said echo-reduced output signal.

6. The echo removing apparatus as claimed in claim 1 wherein said first characteristics conversion means is a finite impulse response filter having fixed coefficients.

7. The echo removing apparatus as claimed in claim 1 further comprising a decoder wherein said generated sound signal is produced by said decoder by decoding an encoded sound generated signal, and wherein said first characteristics conversion means comprises a filter having a plurality of coefficients determined by parameters encoded in said encoded sound generated signal.

8. The echo removing apparatus as claimed in claim 1 wherein said filter means outputting said pseudo echo signal has a plurality of filter coefficients estimated and updated using a plurality of smoothed power input values of said generated sound signal.

* * * * *

UNITED STATES PATENT AND TRADEMARK OFFICE
CERTIFICATE OF CORRECTION

PATENT NO. : 7,394,898 B1
APPLICATION NO. : 08/611198
DATED : July 1, 2008
INVENTOR(S) : Akira Inoue and Masayuki Nishiguchi It is certified that error appears in the above-identified patent and that said Letters Patent is hereby corrected as shown below:

Column 1, line 12, "effect as of" should read -- effect of --.
Column 1, line 16, "ing round on the" should read -- ing on the --.
Column 2, line 53, "control led" should read -- controlled --.

Column 6, line 58, " " should read $$E\left[\|e(k)\|^2\right]$$

--.

Column 8, line 59, "a-parameters" should read -- α-parameters --.

Column 9, line 64, " " should read $$b_{k+1}(i) = b_k + \frac{\mu e(k) x(k-i)}{\|X(k)\|^2} \quad i = 0, 1, \cdots, N-1 \quad (21)$$

--.

Column 10, line 5, " " should read $$\|X(k)\|^2 = \sum_{i=0}^{N-1} |x(k-i)|^2 \quad (22)$$

--.

Column 10, line 34, " " should read $$b_{k+1}(i) = b_k + \frac{\mu e(k) x(k-i)}{P_x(k)} \quad i = 0, 1, \cdots, N-1 \quad (23)$$

--.

Column 10, line 45, " " should read $$P_k(k) = \frac{N}{L} \sum_{i=0}^{L-1} |x(k-i)|^2 \quad (24)$$

--.

UNITED STATES PATENT AND TRADEMARK OFFICE
CERTIFICATE OF CORRECTION

PATENT NO. : 7,394,898 B1
APPLICATION NO. : 08/611198
DATED : July 1, 2008
INVENTOR(S) : Akira Inoue and Masayuki Nishiguchi It is certified that error appears in the above-identified patent and that said Letters Patent is hereby corrected as shown below:

Column 10, line 53, "$P_x(k) = \lambda P_x(k-1) + (1 - \lambda)|x(k)|^2$," should read $$P_k(k) = \lambda P_x(k-1) + (1-\lambda)\left|x(k)\right|^2 \quad (25)$$

--.

Column 11, line 18, "CL of taps" should read -- of taps --.

Signed and Sealed this

Twenty-third Day of June, 2009

JOHN DOLL
*Acting Director of the United States Patent and Trademark Office*